May 28, 1957 P. M. MINDER ET AL 2,794,154
NEUTRAL GROUNDING DEVICE
Filed July 16, 1953
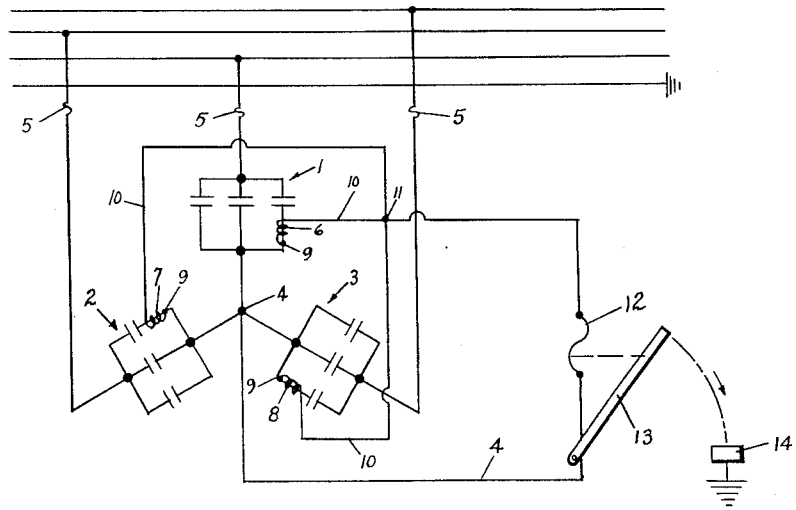
Fig. 1
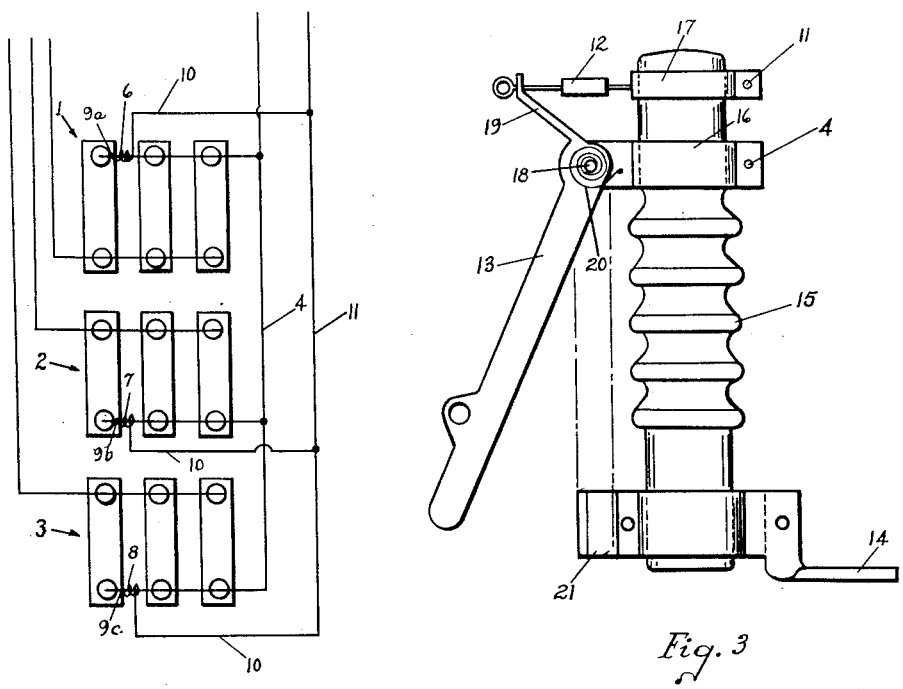
Fig. 2
Fig. 3
INVENTORS
Peter M. Minder
Blaine H. Schultz
BY
Charles A. ...
Attorney

2,794,154
NEUTRAL GROUNDING DEVICE

Peter M. Minder, Milwaukee, and Blaine H. Schultz, South Milwaukee, Wis., assignors to McGraw-Edison Company, a corporation of Delaware Application July 16, 1953, Serial No. 368,284

5 Claims. (Cl. 317—12)

This invention relates to a protective system for electrical apparatus and in particular to a system for detecting unbalance or faults on a bank of capacitors for the purpose of actuating a grounding switch.

On electrical transmission and distribution systems, capacitors are used to correct the power factor. It is usually desirable to Y-connect the capacitor units. However, Y-connected capacitor banks, if grounded, reduce the zero-sequence impedance thereby allowing higher values of harmonic current to flow in the neutral. When the neutral of the capacitor bank is connected to ground, an excellent return path to a polyphase circuit is provided for the flow of high harmonics and as these grounding wires are often adjacent to communication lines, the harmonic interference is a nuisance problem. There may also be interference caused by harmonics in the phase wires.

In the copending patent application Serial No. 357,996 of Blaine H. Schultz and Peter M. Minder, filed May 28, 1953, and assigned to the same assignee as this application, the problem of harmonic interference was solved by normally isolating the neutral from ground and grounding the neutral only when a fault occurred in any of the capacitor units. In the protective systems disclosed in that application, the fault is detected by splitting the neutral of Y-connected capacitor banks and inserting a voltage or current sensitive device between them to actuate a grounding means when a capacitor in either half of the bank fails.

The object of this invention is to provide in a polyphase capacitor bank a fault detecting device that can be applied to an installed capacitor bank without rewiring the neutral connection.

Another object of this invention is to provide a detecting circuit to actuate a switch for grounding an ungrounded neutral of a Y-connected capacitor bank upon failure of a capacitor in any phase of a polyphase circuit.

A further object of this invention is to provide in a polyphase capacitor bank a small current transformer in the neutral connection of one capacitor per phase, the secondaries of the current transformers being connected in parallel and the resulting current upon failure of a capacitor actuating a switching device for grounding the normally isolated bank neutral.

And still another object of this invention is to provide a protective arrangement for a Y-connected capacitor bank having an ungrounded neutral whereby the neutral thereof may be grounded upon failure of any capacitor in said connected bank.

Other objects will appear from time to time in the course of the specification and claims.

The inventive idea is illustrated more or less diagrammatically in the accompanying drawings in which:

Fig. 1 is an electrical diagram of an unbalance detecting circuit.

Fig. 2 is partly a diagrammatic illustration of the circuit of Fig. 1.

Fig. 3 is a front elevation of a switch means operated by the electrical circuit of Figs. 1 and 2.

By referring to Fig. 1, it can be seen that the capacitor bank comprises capacitor phase groups 1, 2, and 3 Y-connected at neutral point 4. The capacitor bank is Y-connected to three phases of a polyphase circuit, each of which is fed through a fuse 5 in each phase of the circuit.

Three small current transformers 6, 7, and 8 derive an alternating current from each phase group proportional to the current through one capacitor in the respective phase group. Electrically, it is immaterial to which capacitor it is serially connected and so the most conveniently placed capacitor can be used. The current transformers 6, 7, and 8 can be small toroids of electrical steel with a few windings around them. The windings are connected at one end to the neutral of the capacitor bank at 9a, 9b, and 9c respectively and the other ends 10 are connected to each other at point 11.

The common neutral 4 of the Y-connected capacitor bank and the point 11 are connected to each other by means of a fuse 12 thus completing a circuit through each of the windings 6, 7, and 8. The fuse 12 controls a switch 13 which is biased for movement into contact with a ground connection 14 upon rupture of the fuse.

This switching means can take various forms one of which, illustrated in Fig. 3, includes a ground terminal 14 which is normally insulated from the neutral point 4 of the protected capacitor bank by an insulator bushing 15. At the upper end of bushing 15 is a pair of conductive collars 16 and 17, respectively, which are spaced from each other along the longitudinal axis of bushing 15. Referring to Fig. 1 in conjunction with Fig. 3 it will be seen that collar 16 may be connected with neutral point 4 of the capacitor bank and that neutral point 4 is at the same electrical potential and connected with each of the terminal ends 9 of the respective current transformers 6, 7 and 8. The other terminal ends of the current transformers are connected in multiple at point 11 on conductive collar 17. Hence, in operation, the current transformers 6, 7 and 8 and a fuse link assembly 12 are connected in parallel across the conductive collars 16 and 17.

A switch blade 13 is also mounted on the collar 16 pivotally at 18 and is held out of contact with the ground connection 14 by the fuse 12 which holds an arm 19 of the switch blade 13. A spring 20 around the pivot point 18 biases the switch blade 13 downwardly so that when the fuse 12 ruptures and releases the arm 19, the spring 20 immediately thrusts the switch blade 13 downwardly into contact position with a contact arm 21 of the grounding connection 14.

Thus, it can be seen that the common neutral 4 from the Y-connected capacitor banks and the common conductor 11 from the current transformers in each phase are in conductive relationship through a fuse 12. If a capacitor in any phase should fail, the resulting unbalance in the bank will be detected by the three current transformers. The resulting current flowing between the points 4 and 11 will blow the fuse 12 and thereby release the spring tensioned switch blade 13. The released switch blade will instantly swing downwardly to contact the ground contact arm 21 and ground the neutral of the Y-connected capacitor bank.

The resultant secondary current of the three parallel connected current transformers, which flows through the fuse, is practically zero under balanced condition, that is when all capacitor units are intact. However, if a capacitor fails a current increase of 3N times will occur through the current transformer connected in series with the failed capacitor, where N is the number of units in parallel per phase. In case of a capacitor failure in whose circuit no current transformer is connected, the current transformer connected in series with a capacitor of the same phase group is by-passed and consequently no current is flowing through that current transformer. The impedance of this practically open circuited transformer prevents the flow of a considerable current through it from the two other current transformers. In both cases of capacitor failures, the resulting secondary current of the current transformers, that is the total current of all current transformers together, is different from zero. Use of this fact is made to blow the fuse.

From the foregoing, it will be obvious that this novel arrangement may be easily combined with existing capacitor banks without disturbing the latter and that the other objects of this invention have been realized.

Although we have illustrated a fuse controlled grounding switch, it will be obvious that we may substitute for the fuse, the solenoid controlled device disclosed in our copending application Serial No. 357,996, filed May 28, 1953, aforementioned.

We claim:

1. In a polyphase electrical system having a grounded neutral, a bank of capacitors connected in star to said system and having a normally ungrounded neutral, a fuse in each phase of said capacitor bank between said bank and said system, a current transformer in each phase of said capacitor bank in series with a single capacitor in the respective phase, the secondaries of all of said transformers being connected in parallel, a switch adapted when closed to ground the neutral of said bank and biased to closed position, and a fusible element connected in a series circuit with the paralleled transformer secondaries and normally restraining said switch in open position wherein the neutral of said bank is isolated from ground, said fusible element being adapted upon rupture to release said switch to ground the neutral of said bank.

2. In combination with a polyphase electrical system having a grounded neutral, a bank of capacitors connected in star to said system and having a normally ungrounded neutral, a fuse in each phase of capacitors between said bank and said system, means for deriving an alternating current from each phase of said star-connected capacitor bank proportional to the current through a single capacitor in the respective phase, said means including a current transformer in each phase of said bank in series with a single capacitor in the respective phase, the secondaries of said current transformers being connected in parallel to simultaneously vectorially add said derived alternating currents, and means responsive to a predetermined sum of said derived currents for grounding the neutral of said bank.

3. In a three phase electrical system having a grounded neutral, in combination, a bank of capacitors connected in Y to said system and having a normally ungrounded neutral, a fuse in each phase of said capacitor bank between said bank and said system, means including a current transformer in each phase of said capacitor bank for deriving an alternating current from each phase of the bank proportional to the current through one capacitor in the respective phase, the secondaries of said current transformers being connected in parallel, one side of said parallel arrangement of transformer secondaries being connected to the neutral of said bank, a switch adapted when closed to ground the neutral of said bank and being biased toward closed position, a fusible element connected between the neutral of said bank and the other side of said parallel arrangement of secondaries and normally restraining said switch in open position wherein the neutral of said bank is isolated from ground, said fusible element upon rupture being adapted to release said switch for movement to closed position, whereby grounding of the neutral of said bank incident to failure of a capacitor will rupture the fuse connected to the failed capacitor and remove the phase of capacitors including the failed capacitor from the system.

4. In a three phase electrical system having a grounded neutral, a Y connected bank of capacitors connected to said system, said bank comprising separate phase groups each of which includes one or more capacitors, a fuse in each phase group between said phase group and the electrical system, said phase groups being connected at a common point to define a neutral point normally isolated from ground, a current transformer in each phase group having a primary and a secondary winding, each of said primaries being serially connected with a capacitor in the respective phase group, each of said secondary windings having a first end connected with said neutral point and a second end connected with the second ends of the other secondary windings, and current responsive means connected between said neutral point and the commoned second ends of said secondary windings for grounding said neutral point upon flow of a predetermined current therethrough incident to failure of a capacitor in said bank.

5. In a three phase electrical system, in combination, a Y connected bank of capacitors connected to said system, said bank comprising separate phase groups each of which includes one or more capacitors, said phase groups being connected at a common point to define a neutral point normally isolated from ground, and means for detecting failure of a capacitor in any of said phase groups including a current transformer in each phase group for deriving a current proportional to the current through a single capacitor in the respective phase group, the secondary windings of said current transformers being connected in parallel, and a current sensitive detecting device connected in a series circuit with the paralleled secondary windings of said current transformers.

References Cited in the file of this patent

UNITED STATES PATENTS 2,371,496    Bennett  ---------------- Mar. 13, 1945

OTHER REFERENCES

"Bank of Capacitors Reinforces 132–kv. Grid," L. F. Ferri, C. S. Dayton, "Electrical Worlds," pp. 66–69, March 29, 1947.